Patented June 10, 1930

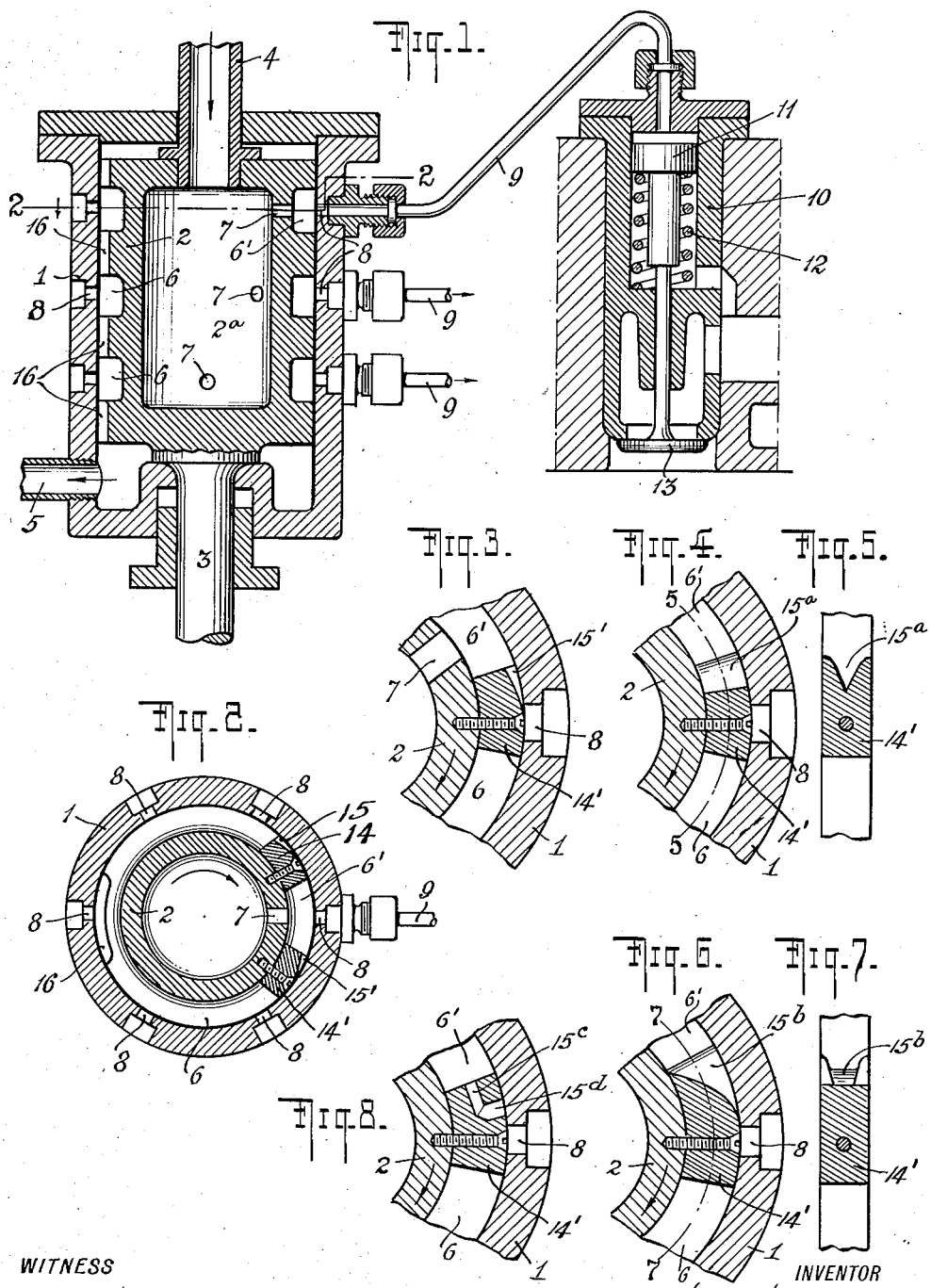

1,763,154

UNITED STATES PATENT OFFICE

HANS HOLZWARTH, OF DUSSELDORF, GERMANY, ASSIGNOR TO HOLZWARTH GAS TURBINE CO., OF SAN FRANCISCO, CALIFORNIA, A CORPORATION OF DELAWARE

CONTROLLING DEVICE

Application filed March 11, 1927. Serial No. 174,500.

The invention relates to mechanisms and apparatus including elements arranged to perform their functions in sequential operative steps which require said elements to be maintained in several positions for predetermined periods of time, and the operation of which is effected through the medium of a fluid under pressure. An example of such mechanism or apparatus is found in internal combustion turbines of large dimensions in which the operation of more or less widely separated elements, such as inlet valves, exhaust valves and fuel valves is controlled by means of a single controlling device and the actuating medium is a suitable fluid, such as oil, under pressure. In such machines, it is necessary to use conducting tubes of considerable length and large diameters, in which oil columns are developed which, in the operation of the controller, create disturbances of the machine elements resulting in undesirable noise, shocks and oscillations. The object of the present invention is to provide an improved controlling device whereby these objections are overcome and through the medium of which the control of the cooperating elements is effected in a simple and efficient manner. Other objects will appear from the description hereinafter and the features of novelty will be pointed out in the claim.

In the accompanying drawings, which illustrate an example of the invention without defining its limits, Fig. 1 is a diagrammatic section illustrating the controlling device embodied in an internal combustion turbine; Fig. 2 is a cross section on the line 2—2 of Fig. 1; Fig. 3 is a fragmentary detail section on an enlarged scale showing the parts in a different position; Fig. 4 is a similar view illustrating another form of the invention; Fig. 5 is a detail section thereof on the line 5—5 of Fig. 4; Fig. 6 is a fragmentary section of still another form of the invention; Fig. 7 is a detail section on the line 7—7 of Fig. 6, and Fig. 8 is a fragmentary detail section of a further embodiment of said invention.

For the purpose of illustrating and describing the invention I have shown an embodiment thereof as it would appear in connection with internal combustion engines of relatively large dimensions and which, generally speaking, include air inlet valves, exhaust valves and fuel inlet valves located at more or less widely operated points in the turbine and controlled through the medium of a single controlling device, the active controlling medium being an oil or other suitable fluid under pressure. Having reference to a given combustion chamber of such turbine the oil or its equivalent, controlled by the controlling device, operates first to open the air valve momentarily, then to open the fuel valve momentarily and then to hold the exhaust or nozzle valve open momentarily; in order that a most efficient operation of the turbine may be secured it is essential that these momentary periods of time be accurately followed in proper sequence. In the operation of such turbines the exhaust valve is blown open against the resistance of its spring by the explosion of the fuel mixture and the purpose of the oil pressure or its equivalent is to maintain the exhaust valve in its open position as the pressure in the explosion chamber decreases because of discharge through the cooperating nozzle and also while the first portion of the incoming air blows through and cleanses the combustion chamber. The explosion takes place after the air valve and the gas valve have closed and the combustion chamber has been charged with the proper mixture. The controlling device in such machines comprises a cylindrical casing 1 in which a hollow controlling member is rotatably mounted upon a shaft 3 which passes through a stuffing box of the casing 1 and is rotated through the medium of suitable mechanism which it is unnecessary to illustrate in the present case; it is simply to be kept in mind that the controlling member 2 is rotated in a manner to operate synchronously with the other parts of the turbine. The inner chamber 2$^a$ of the controlling member 2 is in constant communication with a source of oil under pressure or its equivalent through the medium of a pipe 4 which is arranged so as not to interfere with the rotatability of said member 2, while the casing 1 is provided with an outlet connection 5 which leads to a container in which a pressure reduced with respect to the aforesaid pressure of the oil such as, for instance, atmospheric pressure exists. The controlling member 2 is provided with one or more annular channels which communicate with the chamber $2^a$ through the medium of radial openings 7 and are arranged in registry with radial openings 8 in the casing 1; the openings 8 in the illustrated example are connected with the instrumentalities, the operation of which is brought about by the oil or equivalent fluid under pressure. In the drawings the uppermost opening 8 in the illustrated example is accordingly connected by means of a pipe 9 with the upper end of the cylinder 10 in which the piston 11 of an air valve 13 is mounted for reciprocation, said piston being maintained in and returned to its normal position by means of a coil spring 12 whereby the valve 13 is normally held in its closed position. The aforesaid annular channels of the controlling member 2 are divided into chambers 6 and 6' by means of blocks 14 and 14' spaced apart and secured in connection with the member 2 in any suitable manner as by means of fastening screws or the like; as shown in the drawings the blocks 14 slidably engage the inner surface of the casing 1 so as to prevent communication between the aforesaid chambers 6 and 6'. Communication between the chamber 6 and the outlet connection 5 is established through the medium of recesses 16 formed in the member 2 as illustrated in Figs. 1 and 2. It will be understood that, in cases where the controlling device serves to control a plurality of elements as in the illustrated example, the casing is provided with a plurality of openings 8 which are each connected through the medium of pipes 9 with the elements to be controlled; thus one of said pipes 9 in the present case leads to the fuel valve while the remaining pipe 9 leads to the exhaust valve of the internal combustion turbine of which the device forms a part. In such cases the blocks 14 and 14' are arranged in the different annular channels so as to off-set the chambers 6 and 6' of one channel with respect to the corresponding chambers of the other channels or, in other words, to position said chambers in a manner to secure the predetermined operation of the valves in question or their equivalent.

With the parts in the position shown in Figs. 1 and 2 the chamber 6' of the upper channel is in registry with the opening 8 which is in communication with the valve cylinder 10 and thereby establishes communication between the latter and the chamber $2^a$ so that the oil under pressure or its equivalent is effective upon the piston 11 and accordingly depresses the same against the tension of the spring 12 and thereby adjusts the valve 13 to its open position. The latter is maintained in this open position as long as the previously mentioned chamber 6' remains in communication with the opening 8; as the controlling member 2 is rotated in the direction of the arrow in Fig. 2, the block 14 will finally come into registry with the said opening 8 and will thereby break the connection between the valve cylinder 10 and the chamber $2^a$, this break in said connection being maintained during the period of time required by the block to pass the opening 8. As soon as this happens the latter will be brought into communication with the cooperating chamber 6 and thereby will connect the outlet 5 with the cylinder 10 through the recesses 16; as a result of this the oil under pressure or its equivalent above the piston 11 will be relieved and the latter under the influence of the spring 12 will be forced upwardly in said cylinder to return the valve 13 to its closed position. As the upward movement of the piston 11 takes place the oil will be forced back through the pipe 9 and through the opening 8 into the chamber 6 and thence through the recesses 16 to the outlet 5 by which it is conducted to the previously mentioned container for return by suitable means to the pressure tank.

It has been demonstrated in practice that, if the communication between the chamber 6' and the opening 8 and between the latter and the chamber 6 is suddenly brought about, the oil column in the pipe 10 is set in motion with such rapidity that oscillations and vibrations are developed in said pipe which are combined with excessive hammering noises and result in a knocking of the valve and great strains upon the machine elements. In order to avoid these disadvantages the controlling device is provided with means whereby the connection between the openings 8 and the respective chambers 6' and 6 is gradually brought about. In the form shown in Figs. 1, 2 and 3 this means comprises a throttling channel 15' formed in the block 14' and a corresponding channel 15 formed in the block 14, these channels being located in those surfaces of the blocks which engage the inner surface of the casing 1 at the tail ends of said blocks with respect to the operative rotatable motion of the controlling member 2. As shown in Figs. 2 and 3 the channels 15' and 15 are of gradually increasing depth in radial directions so that the connection between the opening 8 and the respective chambers 6' and 6 is gradually increased in area until the final complete connection takes place. This is clearly shown in Fig. 3 in which the block 14' is in a position in which the communication between an opening 8 and a chamber 6' is just beginning to be made, it being obvious that as the rotation of the member 2 continues in the direction of the arrow, the gradually increasing depth of the channel 15' which gradually increases the area of this communication, will bring about a gradual connection between the chamber 2ª and the pipe 9 until the final complete connection is effected. The same is true with respect to the block 14 and the channel 15 which correspondingly serves to establish a gradual connection between the pipe 9 and the chamber 6. As a consequence of this arrangement sudden communication between any of the pipes 9 or their equivalent and the chambers 6' and 6 or their equivalent is avoided with the result that the objectionable oscillations hereinbefore referred to are entirely avoided in the oil columns and the operation of the valves or equivalent elements is accordingly accomplished without excessive noises and without strain upon the machine elements.

The throttle channels 15' and 15 may be replaced by equivalent devices operated to bring about corresponding results. For instance as shown in Figs. 4 and 5 the aforesaid channels may extend through the blocks 14 or 14' in radial directions and diverge circumferentially in directions opposite to the direction of rotation of the member 2, as shown at 15ª; in other words the aforesaid channels in this case would have a wedge shape as shown in Fig. 5.

In the form shown in Figs. 6 and 7 the channels, in addition to being wedge shaped in a circumferential direction, are wedge shaped also in radial directions as shown at 15ᵇ.

In the form shown in Fig. 8 the means whereby the aforesaid gradual communication is brought about comprises channels having two branches one of which 15ᶜ in each instance extends in a generally circumferentially direction opposite to the direction of rotation of the member 2 and the other 15ᵈ extends in a radial direction and terminates in the outer surface of the blocks 14' or 14 as the case may be.

In all of the forms shown and described the same gradual communication is established between the openings 8 and the chambers 6' or 6 and the same advantages exist as in the form first described.

While the device has been described with respect to an apparatus in which oil under pressure is the operating medium it will be understood that it may be embodied with equal advantages in apparatus in which some other fluid either electric or non-electric is the controlling medium.

Various changes in the specific forms shown and described may be made within the scope of the claim without departing from the spirit of my invention.

I claim:

A device for controlling a fluid-pressure-operated instrumentality, comprising a casing having an outlet and an opening adapted to be connected with such instrumentality, a controlling member rotatably mounted in said casing and provided with an annular outwardly open channel in registry with said opening, partition blocks in said channel whereby the latter is divided into independent chambers, one of which is adapted to be placed in communication through the interior of said controlling member with a source of fluid under pressure, and the other of which is in communication with the outlet of the casing, each of said blocks being so constructed as to provide one or more channels communicating with the chamber to the rear of such block and adapted to come into registry with said opening and increasing in effective total cross-section toward such chamber, whereby communication between said opening and said chambers in succession is established gradually from zero to the full area of such opening.

In testimony whereof I have hereunto set my hand.

HANS HOLZWARTH.